(12) United States Patent
Kang et al.

(10) Patent No.: US 9,238,276 B2
(45) Date of Patent: Jan. 19, 2016

(54) METHOD OF MANUFACTURING MASK ASSEMBLY FOR THIN FILM DEPOSITION

(71) Applicant: Samsung Display Co., LTD., Yongin, Gyeonggi-do (KR)

(72) Inventors: Taek-Kyo Kang, Yongin (KR); Jung-Woo Ko, Yongin (KR); Sang-Shin Lee, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 13 days.

(21) Appl. No.: 14/010,479

(22) Filed: Aug. 26, 2013

(65) Prior Publication Data
US 2014/0239049 A1 Aug. 28, 2014

(30) Foreign Application Priority Data

Feb. 27, 2013 (KR) .......................... 10-2013-0021528

(51) Int. Cl.
  *B23K 31/02* (2006.01)
  *B23K 11/00* (2006.01)
  *B23K 11/10* (2006.01)

(52) U.S. Cl.
  CPC ............ *B23K 31/02* (2013.01); *B23K 11/0026* (2013.01); *B23K 11/10* (2013.01)

(58) Field of Classification Search
  CPC .... B05C 21/005; B23K 31/003; B23K 11/10; B23K 11/105; B23K 11/11
  USPC .......................................... 219/127, 86.1, 87
  See application file for complete search history.

(56) References Cited

U.S. PATENT DOCUMENTS

| 1,934,673 | A | * | 11/1933 | Klemperer | .................... 428/594 |
| 4,588,894 | A | * | 5/1986 | Yasuzuka | .................... 250/483.1 |
| 5,880,424 | A | * | 3/1999 | Katoh | ............................ 219/86.7 |
| 6,631,942 | B1 | * | 10/2003 | Kitagawa | .................... 296/187.1 |
| 7,709,132 | B2 | * | 5/2010 | Ishizuka et al. | ................ 429/470 |
| 8,420,251 | B2 | * | 4/2013 | Watanabe et al. | .............. 429/158 |
| 8,776,718 | B2 | * | 7/2014 | Park et al. | ...................... 118/504 |
| 2003/0221614 | A1 | * | 12/2003 | Kang et al. | ..................... 118/504 |
| 2006/0012290 | A1 | * | 1/2006 | Kang | ............................. 313/504 |
| 2010/0192856 | A1 | * | 8/2010 | Sung et al. | ..................... 118/721 |
| 2010/0267227 | A1 | * | 10/2010 | Ko et al. | ......................... 438/597 |
| 2012/0299024 | A1 | * | 11/2012 | Lee et al. | ......................... 257/88 |

FOREIGN PATENT DOCUMENTS

| DE | 3313296 A1 | * | 10/1984 |
| JP | 08001910 A | * | 1/1996 |
| KR | 10-2000-0002155 A | | 1/2000 |
| KR | 10-2001-0098434 A | | 11/2001 |
| KR | 10-2003-0012214 A | | 2/2003 |

* cited by examiner

*Primary Examiner* — Devang R Patel
*Assistant Examiner* — Carlos Gamino
(74) *Attorney, Agent, or Firm* — Christie, Parker & Hale, LLP (57) ABSTRACT

A method of manufacturing a mask assembly for thin film deposition includes: positioning a division mask on a mask frame, wherein the division mask has a length in a first direction that is greater than a width in a second direction perpendicular to the first direction; and spot welding opposing ends of the division mask along the first direction to the mask frame, wherein the spot welding comprises: forming first welding points in a first zigzag pattern starting from a peripheral portion along the second direction of the division mask toward a central portion along the second direction of the division mask; and forming second welding points between the first welding points.

8 Claims, 8 Drawing Sheets

METHOD OF MANUFACTURING MASK ASSEMBLY FOR THIN FILM DEPOSITION

CROSS-REFERENCE TO RELATED APPLICATION

This application claims priority to and the benefit of Korean Patent Application No. 10-2013-0021528 filed in the Korean Intellectual Property Office on Feb. 27, 2013, the entire contents of which are incorporated herein by reference.

BACKGROUND

1. Field

The present invention relates to a method of manufacturing a mask assembly for thin film deposition.

2. Description of the Related Art

In general, among flat panel displays, an organic light emitting display has a relatively fast response speed as well as a relatively wide viewing angle and excellent contrast.

The organic light emitting display realizes a color by emitting light through recombination of holes and electrons injected to an anode and a cathode in an emission layer, and has a deposition structure in which the emission layer is positioned between the anode and the cathode. However, with this structure it is difficult to obtain high efficiency light emission. Accordingly, intermediate layers such as an electron injection layer (EIL), an electron transport layer (ETL), a hole transport layer (HTL), and a hole injection layer (HIL) may be selectively added between the electrode and the emission layer.

The intermediate layers, the electrodes, and the emission layer of the organic light emitting display may be formed by several methods, such as a deposition method. The deposition method is a method of depositing an original material of a thin film on a substrate through a fine metal mask (FMM) aligned to the substrate to form a thin film pattern.

The size of the fine metal mask may be increased as the size of the flat panel display is increased. As a large-sized fine metal mask may be formed using a division mask having several separate masks with a stick shape and attaching them in parallel to each other to a mask frame.

The division mask may be attached to the mask frame by spot welding. However, the welding process may deteriorate or warp the division mask, causing undesired separation between the division mask and the substrate.

The above information disclosed in this Background section is only for enhancement of understanding of the background of the invention and therefore it may contain information that does not form the prior art that is already known in this country to a person of ordinary skill in the art.

SUMMARY

An exemplary embodiment of the present invention provides a method of manufacturing a mask assembly for thin film deposition that reduces or minimizes a change (e.g., deterioration or warping) of a division mask due to welding.

A method of manufacturing a mask assembly for thin film deposition according to embodiments of the present invention includes: positioning a division mask on a mask frame, wherein the division mask has a length in a first direction that is greater than a width in a second direction perpendicular to the first direction; and spot welding opposing ends of the division mask along the first direction to the mask frame, wherein the spot welding comprises: forming first welding points in a first zigzag pattern starting from a peripheral portion along the second direction of the division mask toward a central portion along the second direction of the division mask; and forming second welding points between the first welding points.

The spot welding may further include forming a center welding point at the central portion of the division mask before forming the first welding points or after forming the second welding points.

The second welding points may be formed in a second zigzag pattern starting from the peripheral portion along the second direction of the division mask toward the central portion along the second direction to cross a formation path of the first welding points.

The first welding points may be concurrently formed from a first side and a second side, opposite the first side, of the peripheral portion toward the central portion, and the second welding points may be concurrently formed from the first side and the second side of the one of the opposing ends toward the central portion.

The first welding points may be firstly formed from a first side of one of the opposing ends toward the central portion and then may be formed from a second side, opposite the first side, of the one of the opposing ends toward the central portion, and the second welding points may be firstly formed from the first side of the one of the opposing ends toward the central portion and then may be formed from the second side of the one of the opposing ends toward the central portion.

The first welding points may be formed with the zigzag pattern to form 2 columns along the second direction, and the second welding points may be formed between the first welding points along the second direction.

The method may further include supporting the division mask by a supporting bar extending across opposing sides of the mask frame in the second direction.

The method may further include forming a plurality of deposition patterns at the division mask, wherein the division mask crosses the supporting bar between the deposition patterns.

The division mask may be spot welded to the supporting bar between the deposition patterns.

According to an exemplary embodiment of the present invention, the method of manufacturing the mask assembly for thin film deposition is capable of reducing or minimizing a change of the division mask by the spot welding by reducing or minimizing interference between the welding points.

BRIEF DESCRIPTION OF THE DRAWINGS

The drawings described below are for illustrative purposes only and are not intended to limit the scope of the present invention.

DETAILED DESCRIPTION

It will be apparent to those skilled in the art that various modifications and variations can be made in the present invention without departing from the spirit or scope of the invention, and specific exemplary embodiments are exemplified in the drawings and explained in the detailed description. Thus, it is intended that the present invention covers modifications and variations of this invention provided they fall within the scope of the present invention and their equivalents.

Like reference numerals designate like elements throughout the specification. In the drawings, the thickness of layers, films, panels, regions, etc., are exaggerated for clarity. The terms "first", "second", and the like may be simply used for description of various constituent elements, but the meanings may not be limited to restricted meanings. The above terms are used only for distinguishing one constituent element from other constituent elements. For example, a first constituent element may be referred to as a second constituent element and the second constituent element may be referred to as the first constituent element within the scope of the appended claims. When explaining the singular, unless explicitly described to the contrary, it may be interpreted as a plural meaning.

In the specification, the word "comprise" or "has" is used to specify existence of a feature, a numbers, a process, an operation, a constituent element, a part, or a combination thereof, and it will be understood that existence or additional possibility of one or more other features or numbers, processes, operations, constituent elements, parts, or combinations thereof are not excluded. It will be understood that when an element such as a layer, film, region, or substrate is referred to as being "on" another element, it can be directly on the other element or intervening elements may also be present. In contrast, it will be understood that when an element such as a layer, film, region, or substrate is referred to as being "beneath" another element, it can be directly beneath the other element or intervening elements may also be present.

Hereinafter, exemplary embodiments of the present invention will be described in further detail with reference to FIGS. 1 to 5.

Figure 1:
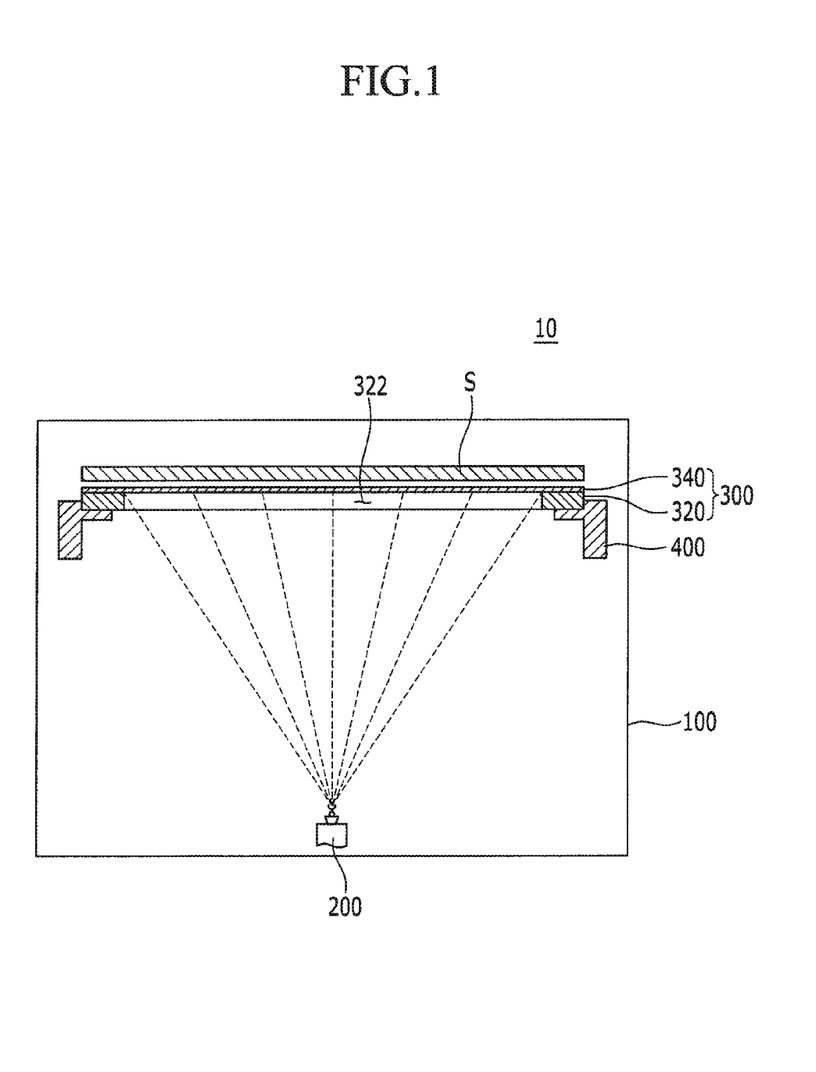
FIG. 1 is a cross-sectional view of an organic thin film deposition device.

FIG. 1 is a cross-sectional view of an organic thin film deposition device 10. Referring to FIG. 1, the organic thin film deposition device 10 includes a chamber 100, a deposition source 200, a mask assembly 300, and a fixing member 400.

The chamber 100 provides a space where a deposition process is performed. For example, the deposition process supplies an organic material to a deposition surface of a substrate S to deposit an organic emission layer. The chamber 100 is coupled to a vacuum pump (not shown) to maintain a vacuum state inside the chamber 100 when performing the process.

The deposition source 200 is positioned at the lower inside of the chamber 100, and the organic material is supplied (e.g., deposited) in a direction toward the deposition surface of the substrate S provided at the upper inside of the chamber 100.

The mask assembly 300 includes a mask frame 320 and a mask 340, and is located at the upper inside (e.g., adjacent to a top surface) of the chamber 100 to face the deposition source 200.

The substrate S is provided on the mask assembly 300. The substrate S may be separated or positioned away from an upper portion of the mask assembly 300 by a predetermined interval in an upper direction, and may be positioned to overlap an entire opening area of an opening 322 of the mask frame 320.

The organic material supplied by the deposition source 200 is deposited on the deposition surface of the substrate S, that is, a lower surface, through the opening 322 of the mask frame 320 and deposition patterns (not shown) of the mask 340. A film of the organic material deposited on the substrate S has a pattern corresponding to the deposition patterns (not shown) of the mask 340.

The fixing member 400 is located outside a moving path of the organic material supplied from the deposition source 200 to the substrate S, and supports an edge portion of the mask assembly 300.

Figure 2:
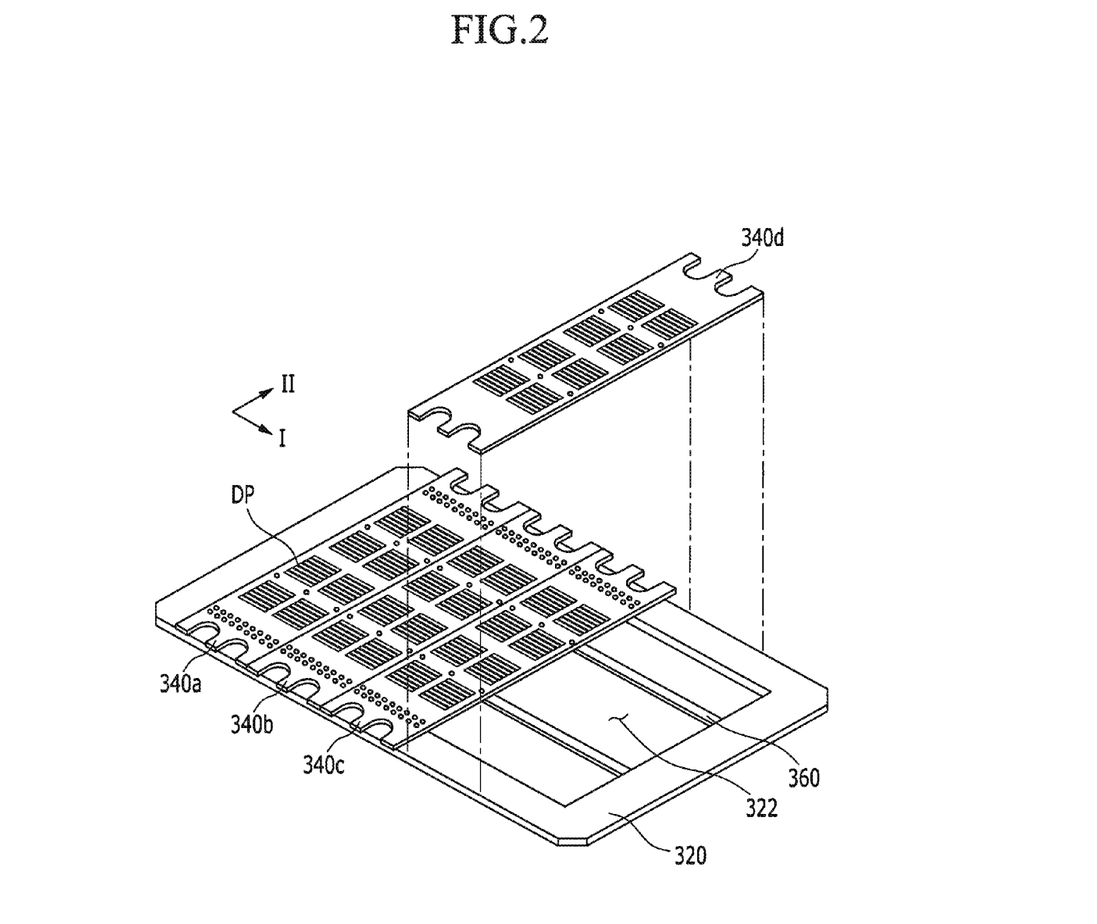
FIG. 2 is an enlarged perspective view of the mask assembly of FIG. 1.

FIG. 2 is an enlarged perspective view of the mask assembly 300 shown in FIG. 1. Referring to FIG. 2, the mask assembly 300 includes the mask frame 320, the mask 340, and a supporting bar 360.

A direction along a long edge of the mask frame 320 is defined as a first direction (I) and a direction along a short edge of the mask frame 320 is defined as a second direction (II).

The mask frame 320 may be provided with a plate of a generally rectangular shape in which the opening 322 is formed. The opening 322 may have an opening area of a size that is capable of sufficiently covering the display region of the substrate S (referring to FIG. 1) that is a deposition object, and for example, may have a generally rectangular shape.

The mask 340 includes a plurality of division masks 340a, 340b, 340c, and 340d. The division masks 340a, 340b, 340c, and 340d may be provided as stick shape plates that are elongated in the second direction (II). That is, the division masks 340a, 340b, 340c, and 340d may have a length in the second direction (II) that is larger than a width in the first direction (I). The division masks 340a, 340b, 340c, and 340d may be fine metal masks (FMM) formed of a metal thin film, and may be provided with one material of steel use stainless (SUS), invar, nickel (Ni), cobalt (Co), or alloys or combinations thereof.

The division masks 340a, 340b, 340c, and 340d include a plurality of deposition patterns DP. The division masks 340a, 340b, 340c, and 340d cross the opening 322 in the second direction (II) and may be positioned adjacent or close to each other on the mask frame 320 along the first direction (I) in a line. Edge regions of the division masks 340a, 340b, 340c, and 340d are attached to the mask frame 320 through spot welding, and a detailed description thereof will be given later.

A plurality of supporting bars 360 may be provided to be implanted to the mask frame 320 while intersecting the opening 322 in the second direction (II) to cross the division masks 340a, 340b, 340c, and 340d and support them. The supporting bars 360 cross the division masks 340a, 340b, 340c, and 340d at positions between the deposition patterns DP of the division masks 340a, 340b, 340c, and 340d and are spot welded to the division masks 340a, 340b, 340c, and 340d.

Figure 3:
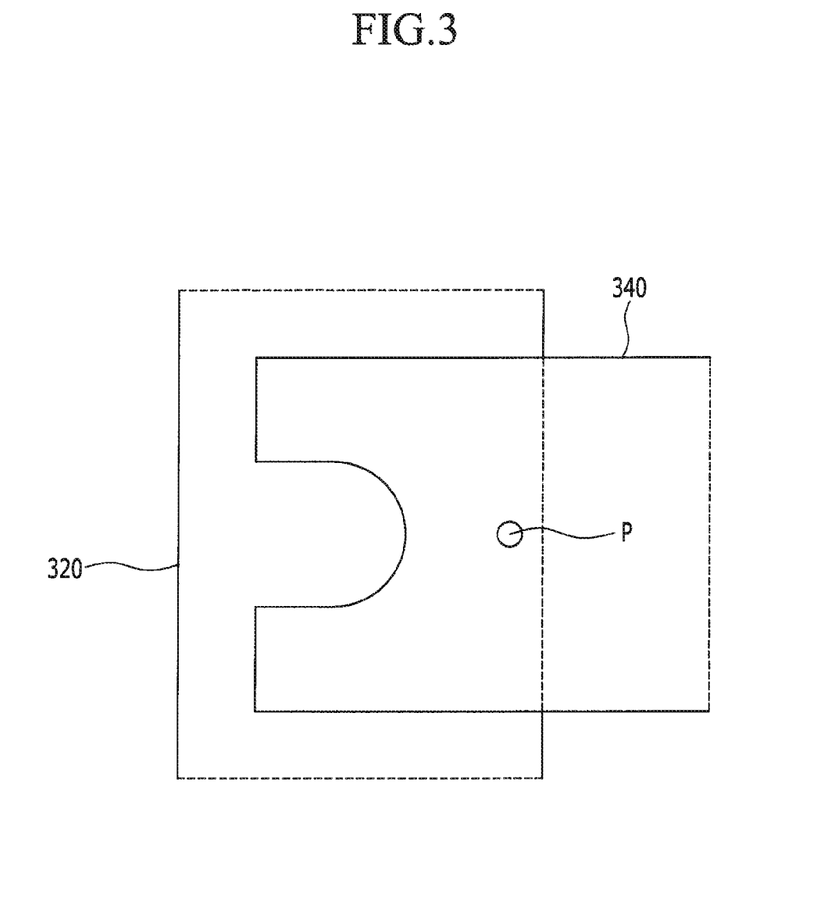
FIG. 3 to FIG. 5 are views showing a process of spot welding the division mask of FIG. 2 to a mask frame according to an exemplary embodiment of the present invention.
Figure 4:
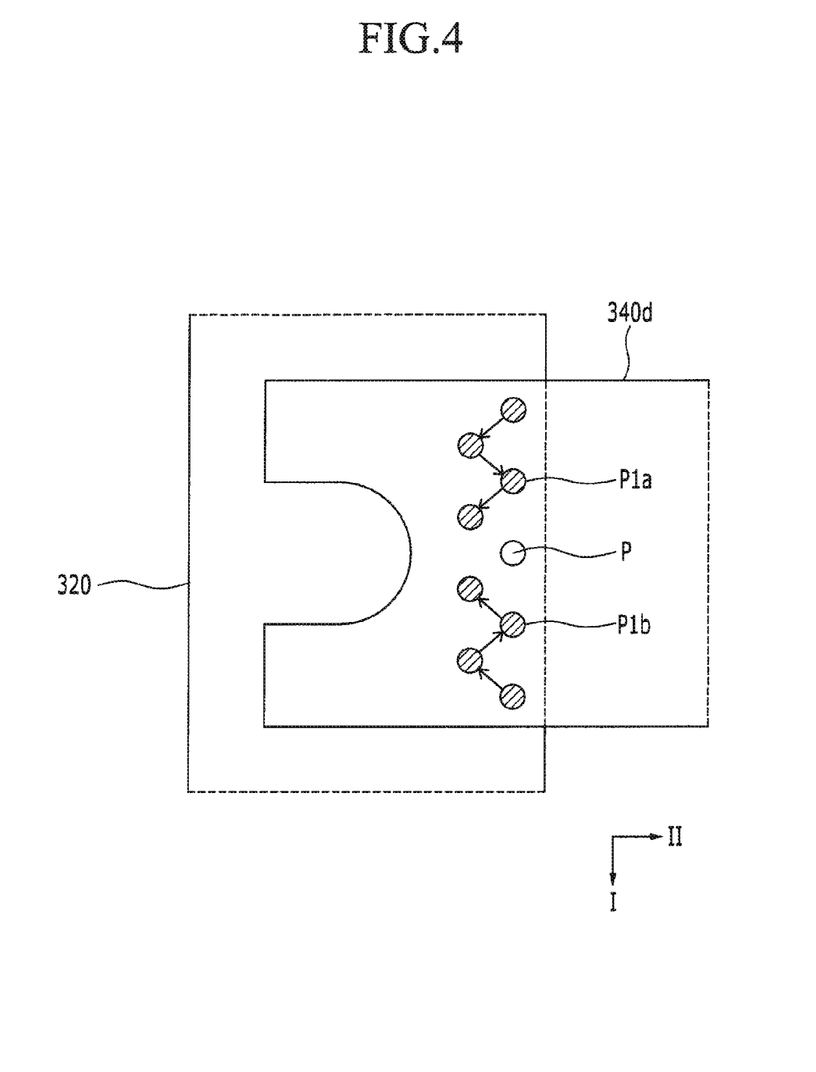
Figure 5:
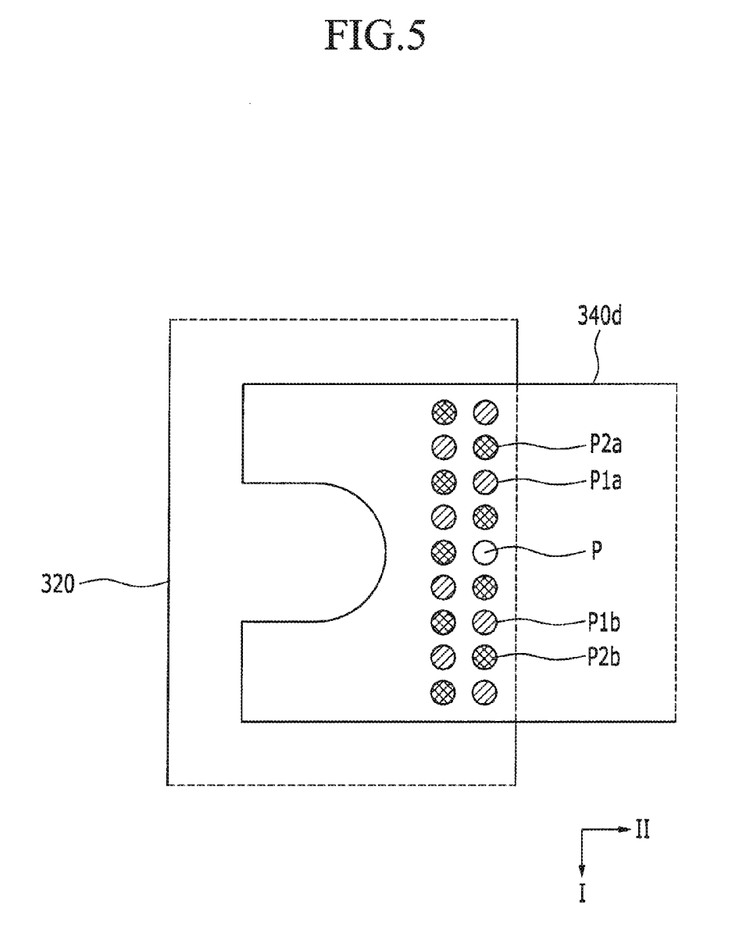

FIG. 3 to FIG. 5 are views showing a process of spot welding a division mask of FIG. 2 to a mask frame according to an exemplary embodiment of the present invention.

Referring to FIGS. 2 to 5, in a state that the division mask 340d is positioned on the mask frame 320 to intersect the opening 322 in the second direction (II), the edge regions of both sides of the division mask 340d are spot welded to the mask frame 320. The spot welding may be performed by sequentially forming a center welding point P (as shown, for example, in FIG. 3), first welding points P1a and P1b (as shown, for example, in FIG. 4), and second welding points P2a and P2b (as shown, for example, in FIG. 5).

Firstly, the center welding point P is formed at the center portion of the edge region of the division mask 340d. (FIG. 3)

After forming the center welding point P, the first welding points P1a and P1b are formed. The first welding points P1a may be formed with a zigzag pattern from the peripheral portion of the edge region of the division mask 340d toward the center portion with reference to the first direction (I), and the first welding points P1b may be formed with a zigzag pattern from the peripheral portion of the edge region of the division mask 340d toward the center portion with reference to the direction opposite to the first direction (I). For example, the first welding points P1a and P1b may be formed in 2 columns.

At this time, the first welding points P1a and P1b may be simultaneously formed from the peripheral portion of both sides toward the center portion. Alternatively, one of the first welding points P1a and P1b may be firstly formed and the other may be sequentially formed. That is, after the first welding points P1a are formed, the first welding points P1b may be sequentially formed, or after the first welding points P1b are formed, the first welding points P1a may be sequentially formed. (FIG. 4)

After forming the first welding points P1a and P1b, the second welding points P2a and P2b are formed. The second welding points P2a may be formed between the center welding point P and the first welding points P1a with reference to the first direction (I), and the second welding points P2b may be formed between the center welding point P and the first welding points P1b with reference to the opposite direction of the first direction (I).

At this time, the second welding points P2a and P2b may be formed (e.g., simultaneously or concurrently formed) from the peripheral portion of both sides toward the center portion. Alternatively, after forming one of the second welding points P2a and P2b, the other may be sequentially forming. That is, after forming the second welding points P2a, the second welding points P2b may be sequentially formed, or the second welding points P2b may be formed and then the second welding points P2a may be sequentially formed.

Also, the second welding points P2a and P2b may be formed with the zigzag pattern from the peripheral portion of the edge region of the division mask 340d toward the center portion to cross the formation path of the first welding points P1a and P1b as shown in FIG. 4. (FIG. 5) That is, the first welding points P1a and P1b may be formed in an alternating pattern of adjacent columns, as shown in FIG. 5, and the second welding points P2a and P2b may be formed between the first welding points P1a and P2b in an alternating pattern in the adjacent columns.

Figure 6:
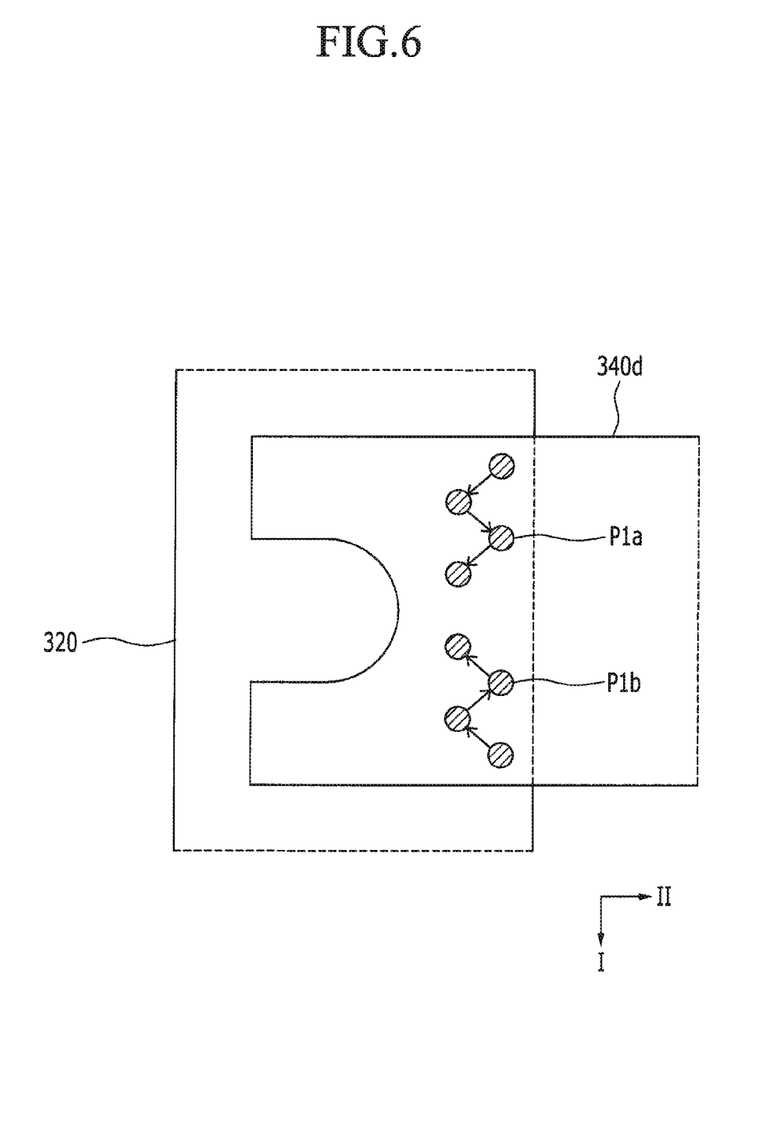
FIG. 6 to FIG. 8 are views showing a process of spot welding the division mask of FIG. 2 to a mask frame according to another exemplary embodiment of the present invention.
Figure 7:
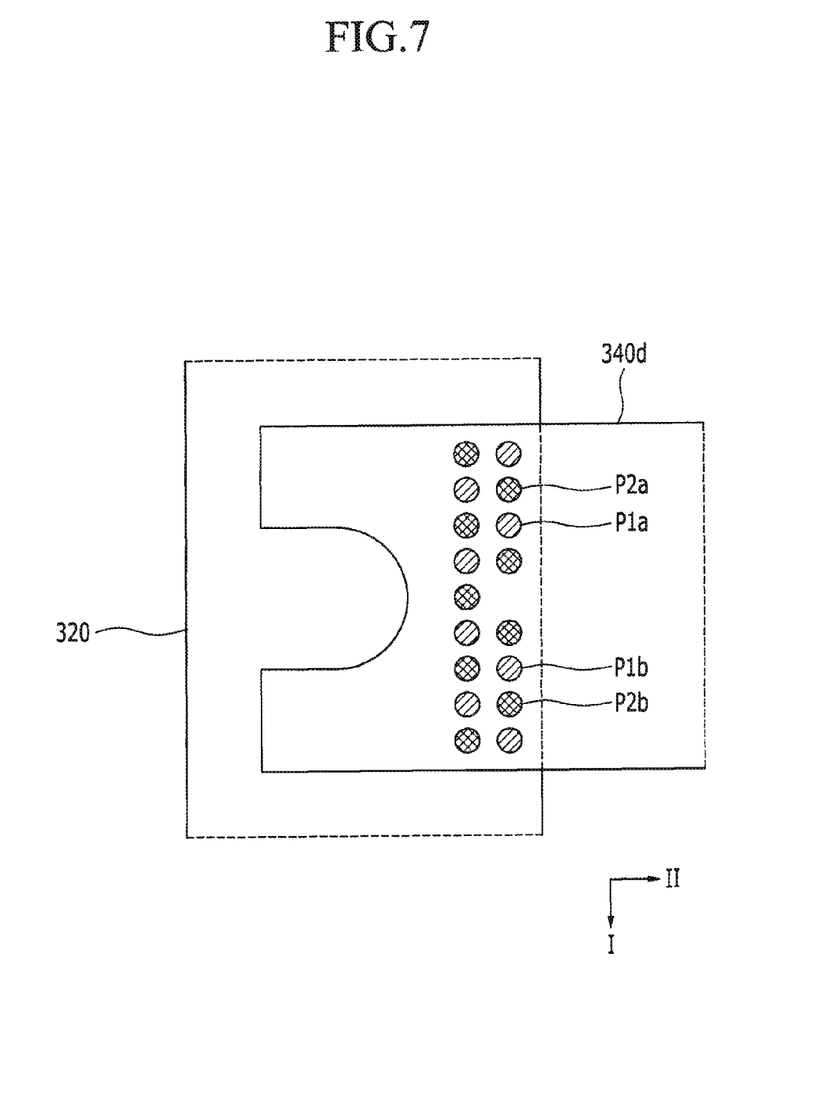
Figure 8:
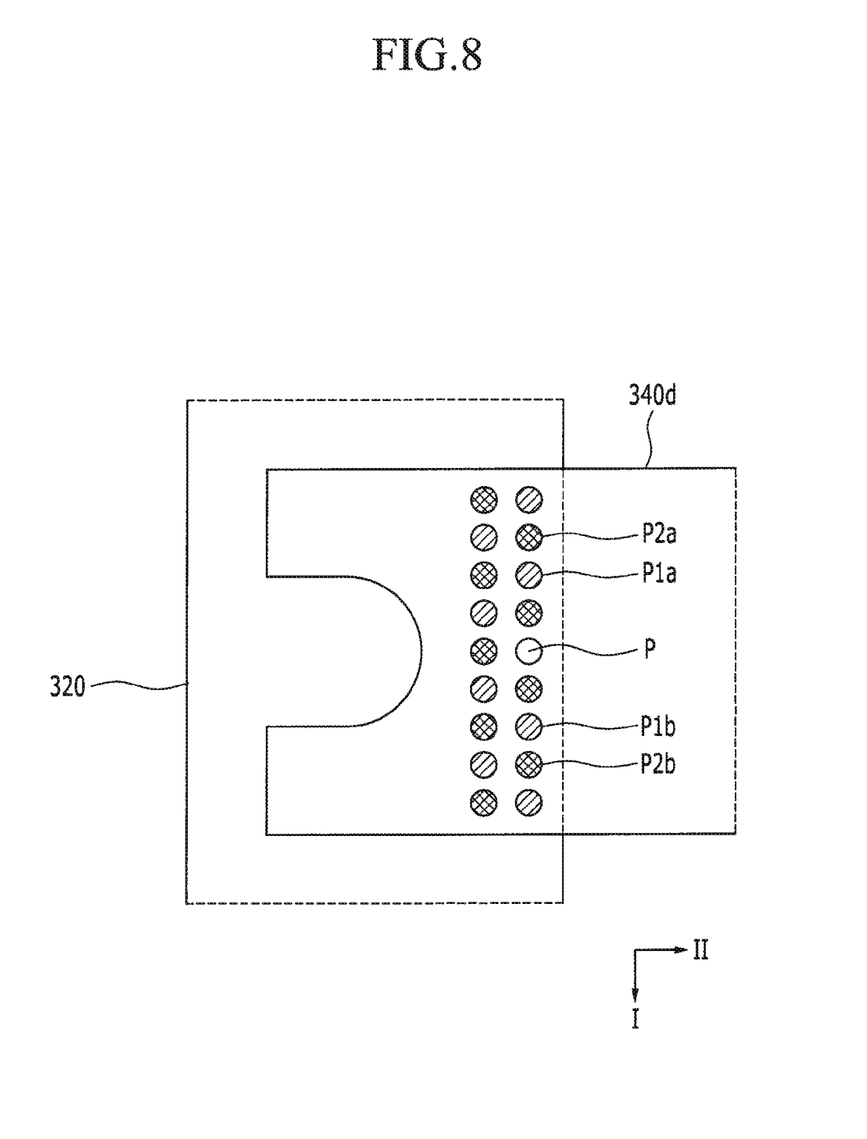

FIG. 6 to FIG. 8 are views showing a process of spot welding a division mask of FIG. 2 to a mask frame according to another exemplary embodiment of the present invention.

Referring to FIG. 2 and FIGS. 6 to 8, in a state that the division mask 340d is positioned on the mask frame 320 to intersect the opening 322 in the second direction (II), the edge regions of both sides of the division mask 340d are spot welded to the mask frame 320. The spot welding may be performed by sequentially forming the first welding points P1a and P1b, the second welding points P2a and P2b, and the center welding point P.

Firstly, the first welding points P1a and P1b are formed. The first welding points P1a may be formed with the zigzag pattern from the peripheral portion of the edge region of the division mask 340d toward the center portion with reference to the first direction (I), and the first welding points P1b may be formed with the zigzag pattern from the peripheral portion of the edge region of the division mask 340d toward the center portion with reference to the opposite direction of the first direction (I). For example, the first welding points P1a and P1b may be formed as 2 columns.

At this time, the first welding points P1a and P1b may be formed (e.g., simultaneously or concurrently formed) from the peripheral portion of both sides toward the center portion. Alternatively, one of the first welding points P1a and P1b may be firstly formed and the other may be sequentially formed. That is, after the first welding points P1a are formed, the first welding points P1b are sequentially formed, or after the first welding points P1b are formed, the first welding points P1a are sequentially formed. (as shown in FIG. 6)

After forming the first welding points P1a and P1b, the second welding points P2a and P2b are formed. The second welding points P2a may be formed between the first welding points P1a with reference to the first direction (I), and the second welding points P2b may be formed between the first welding points P1b with reference to the opposite direction of the first direction W.

At this time, the second welding points P2a and P2b may be simultaneously formed from the peripheral portion of both sides toward the center portion. Alternatively, after forming one of the second welding points P2a and P2b, the other may be sequentially formed. That is, after forming the second welding points P2a, the second welding points P2b may be sequentially formed, or the second welding points P2b may be formed and then the second welding points P2a may be sequentially formed.

Also, the second welding points P2a and P2b may be formed with the zigzag pattern from the peripheral portion of the edge region of the division mask 340d toward the center portion to cross the formation path of the first welding points P1a and P1b, shown in FIG. 6. (FIG. 7) That is, the first welding points P1a and P1b may be formed in an alternating pattern of adjacent columns, as shown in FIG. 7, and the second welding points P2a and P2b may be formed between the first welding points P1a and P2b in an alternating pattern in the adjacent columns.

After forming the second welding points P2a and P2b, the center welding point P is formed at the center portion of the edge region of the division mask 340d. (FIG. 8)

If the welding points of the spot welding are formed through the process described above, interference between the welding points may be reduced or minimized, such that the change generated by the spot welding of the division mask may be reduced or minimized.

While some exemplary embodiments of the present invention have been described with reference to the accompanying drawings, those skilled in the art may change and modify the present invention in various ways without departing from the essential characteristics of the present invention. Accordingly, the disclosed embodiments should not be construed to limit the technical spirit of the present invention, but should be construed to illustrate the technical spirit of the present invention. The scope of the technical spirit of the present invention is not limited by the embodiments, and the scope of the present invention should be interpreted based on the following appended claims. Accordingly, the present invention should be construed to cover all modifications or variations induced from the meaning and scope of the appended claims and their equivalents.

<Description of Some of the Reference Numerals>

| | |
|---|---|
| 100: chamber | 200: deposition source |
| 300: mask assembly | 320: mask frame |
| 340a, 340b, 340c, 340d: division mask | 360: supporting bar |
| 400: fixing member | P: center welding point |
| P1a, P1b: first welding point | P2a, P2b: second welding point |

What is claimed is:

1. A method of manufacturing a mask assembly for thin film deposition, comprising:

positioning a division mask on a mask frame, wherein the division mask has a length in a first direction that is greater than a width in a second direction perpendicular to the first direction; and spot welding opposing ends of the division mask along the first direction to the mask frame, wherein the spot welding comprises:

forming first welding points in a first zigzag pattern, by starting the first zigzag pattern, simultaneously or sequentially, from opposite sides of the division mask and extending the first zigzag pattern along the second direction of the division mask toward a central portion of the division mask; and forming second welding points between the first welding points by forming the second welding points in a second zigzag pattern to extend along the second direction and cross a formation path of the first welding points.

2. The method of claim 1, wherein the spot welding further comprises:

forming a center welding point at the central portion of the division mask before forming the first welding points or after forming the second welding points.

3. The method of claim 2, wherein the first welding points are concurrently formed from a first side and a second side, opposite the first side, of a peripheral portion of the division mask toward the central portion, and the second welding points are concurrently formed from the first side and the second side of the one of the opposing ends toward the central portion.

4. The method of claim 2, wherein the first welding points are firstly formed from a first side of one of the opposing ends toward the central portion and then are formed from a second side, opposite the first side, of the one of the opposing ends toward the central portion, and the second welding points are firstly formed from the first side of the one of the opposing ends toward the central portion and then are formed from the second side of the one of the opposing ends toward the central portion.

5. The method of claim 2, wherein the first welding points are formed with the zigzag pattern to form two columns along the second direction, and the second welding points are formed between the first welding points along the second direction.

6. The method of claim 2, further comprising supporting the division mask by a supporting bar extending across opposing sides of the mask frame in the second direction.

7. The method of claim 6, further comprising forming a plurality of deposition patterns at the division mask, wherein the division mask crosses the supporting bar between the deposition patterns.

8. The method of claim 7, wherein the division mask is spot welded to the supporting bar between the deposition patterns.

* * * * *